United States Patent

[11] 3,599,150

[72] Inventors Joseph George Feinberg
London;
Alan Philip Fosker, Buckinghamshire;
Patrick James Mill, Buckinghamshire, all of, England
[21] Appl. No. 846,966
[22] Filed Aug. 1, 1969
[45] Patented Aug. 10, 1971
[73] Assignee Miles Laboratories Incorporated
Elkhart, Ind.

[54] STABILIZED ALUMINUM HYDROXIDE SUSPENSIONS
9 Claims, No Drawings

[52] U.S. Cl. ................................................ 424/88,
424/89, 424/91, 424/92, 424/157, 424/158, 424/173
[51] Int. Cl. .................................................. A61k 23/00, C12k 5/00

[50] Field of Search ............................................. 424/88–
—92, 157, 158, 173

[56] References Cited
UNITED STATES PATENTS

| | | | |
|---|---|---|---|
| 2,211,745 | 8/1940 | Stephenson | 424/158 |
| 2,755,200 | 7/1956 | Alford et al. | 424/158 |
| 2,999,790 | 9/1961 | Alford | 424/158 |
| 3,148,121 | 9/1964 | Strauss | 424/88 |
| 3,148,122 | 9/1964 | Strauss | 424/91 |

*Primary Examiner*—Shep K. Rose
*Attorneys*—Joseph C. Schwalbach, Michael A. Kondzella, Louis E. Davidson and Harry T. Stephenson ABSTRACT: A freeze stable suspension of an aluminum hydroxide gel having an antibody-producing or immunizing substance adsorbed thereon comprising a suspension of said gel and the addition thereto of certain polyhydric alcohols such as glycerol, mannitol or sorbitol or water-soluble polymers such as polyvinylpyrrolidone or dextran.

STABILIZED ALUMINUM HYDROXIDE SUSPENSIONS

This invention relates to the stabilization of aluminum hydroxide gels having antibody-producing or immunizing substances adsorbed thereon.

It is known that antibody-producing or immunizing substances (hereinafter called the "active substance") such as antigens, allergens, micro-organisms microbial products, toxins and toxoids have enhanced activity when adsorbed in aluminum hydroxide gels and used as suspensions thereof. The enhanced activity of such gels (which are sometimes called "alum-precipitated" as they are often made by addition of alum to a basic solution or suspension of the active substance) is believed to be due to the adsorption of the active substance into the alumina gel, and the resulting slow release of the active substance into the system of the patient being immunized or hyposensitized.

One drawback of such suspensions currently in use is that they are not perfectly stable on storage, especially if they are allowed to freeze, which can easily happen since, as the suspensions deteriorate much more slowly at low temperatures than they do at ambient temperature, they are generally kept refrigerated.

The present invention provides freeze-stable compositions comprising an aluminum hydroxide gel having an active substance adsorbed thereon suspended in a 2 to 18 percent by weight aqueous solution of a water-soluble nontoxic polyhydric alcohol or of a water-soluble nontoxic polymer. The suspension preferably contains 0.1 to 5 percent by weight, and especially about 1 percent by weight, of the aluminum hydroxide gel, and the preferred concentration of the said polyhydric alcohol or polymer is 4 to 10 percent weight/volume of suspension.

It has been found that suspensions in accordance with the present invention can withstand alternate freezing and thawing many times without either precipitation of the gel or elution of the active substance from the gel into the supernatant fluid.

The polyhydric alcohol or water-soluble polymer present in the suspension must not, of course, itself be antigenic or toxic. Suitable polyhydric alcohols include glycerol, sorbitol, mannitol, propylene glycol, polyethylene glycol, glucose, and sucrose. Suitable polymers which preferably are plasma extenders include polyvinylpyrrolidone and dextran. The preferred polyhydric alcohols are glycerol used as 5 percent aqueous solution, or sorbitol or mannitol used as a 2.5 percent aqueous solution. The latter have the advantage that they are approximately isotonic, whereas 5 percent aqueous glycerol is hypertonic.

The aluminum hydroxide gel having the active substance adsorbed thereon may be any of the known preparations of this type, e.g., a gel made by precipitation with potassium aluminum sulfate from an aqueous pyridine extract of an antigenic material, as described and claimed in U.S. Pat. No. 3,148,121 and 3,148,122 and sold under the trade name ALLPYRAL®

A second and more common type of gel is that produced by the addition of aluminum ions to a strictly aqueous extract or solution of an antigen, allergen, micro-organism microbial product, toxin or toxoid. Such alum-precipitated active substances were first disclosed by Glenny et al. in the Journal of Pathology and Bacteriology, 29, : 31, 1926, which publication described the increased antigenicity of a diphtheria toxin and toxoid gel. Later this alum precipitation or gel adsorption technique was extended to other antigens and allergens.

Such aluminum hydroxide gels are usually prepared by adding aluminum ions to a solution of the antibody-producing substance and adjusting the pH of the solution until aluminum hydroxide is formed and precipitates from solution, either occluding or adsorbing and thus insolubilizing the antibody-producing substance. Another method involves the direct addition of preformed aluminum hydroxide gel or suspension to a solution of the antibody-producing substance.

The stabilized aluminum hydroxide gels having antibody-producing substances adsorbed thereon and produced in accordance with this invention, are used in exactly the same manner as the prior art preparations but without fear of elution of the active component from the gel. Such prior art use is described in the aforementioned U.S. Pat. Nos. 3,148,121 and 3,148,122 and generally comprises the use of a larger and less frequent dose of the anitbody-producing substance than would be used if such an active substance was dissolved in an appropriate solvent.

The following Example illustrates the invention

EXAMPLE

A 3.5 ml. of the aluminum hydroxide suspension sold under the trade name ALLPYRAL® (either the grass pollen mix containing 10,000 protein nitrogen units per ml. or the house dust extract containing 20,000 protein nitrogen units per ml.) were mixed with 0.35 ml. of a 50 percent aqueous solution of glycerol or sorbitol. The suspensions obtained were stable to 10 cycles of alternate freezing to $-20°$ C. and thawing without alteration in their physical properties or elution of antigen into the supernatant fluid.

What we claim is:

1. A freeze-stable composition comprising a suspension of an aluminum hydroxide gel having an alum-precipitated aqueous extract or aqueous pyridine extract of an antibody-producing antigenic substance adsorbed thereon in about a 2 percent to 18 percent by weight aqueous solution of a stabilizing substance selected from the group consisting of water-soluble, nontoxic polyhydric alcohols and water-soluble, nontoxic polymers.

2. A composition according to claim 2 wherein the suspension contains 0.1 to 5 percent by weight of the said gel.

3. A composition according to claim 1 wherein the suspension contains about 1 percent by weight of the said gel.

4. A composition according to claim 1 wherein the suspension contains 4 to 10 percent weight/volume of the polyhydric alcohol or polymer.

5. A composition according to claim 1 wherein the stabilizing substance is glycerol.

6. A composition according to claim 1 wherein the stabilizing substance is sorbitol.

7. A composition according to claim 2 wherein the stabilizing substance is mannitol.

8. A composition according to claim 1 wherein the antibody-producing antigenic substance is selected from the group consisting of allergens, micro-organisms microbial products, toxins and toxoids.

9. A composition according to claim 1 wherein the gel is made by the precipitation with alum of an aqueous pyridine extract of the antigenic substance.